(12) United States Patent
Smith et al.

(10) Patent No.: US 11,492,500 B2
(45) Date of Patent: *Nov. 8, 2022

(54) APPARATUS AND METHODS EMPLOYING LIQUID-IMPREGNATED SURFACES

(71) Applicant: Massachusetts Institute of Technology, Cambridge, MA (US)

(72) Inventors: J. David Smith, Arlington, MA (US); Rajeev Dhiman, Pleasanton, CA (US); Kripa K. Varanasi, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 408 days.

This patent is subject to a terminal disclaimer.

(21) Appl. No.: 15/498,437

(22) Filed: Apr. 26, 2017

(65) Prior Publication Data
US 2018/0072895 A1    Mar. 15, 2018

Related U.S. Application Data (63) Continuation of application No. 14/084,126, filed on Nov. 19, 2013, now abandoned.
(Continued)

(51) Int. Cl.
*C09D 5/16* (2006.01)

(52) U.S. Cl.
CPC .......... *C09D 5/1681* (2013.01); *Y10T 428/13* (2015.01); *Y10T 428/24355* (2015.01); *Y10T 428/24802* (2015.01)

(58) Field of Classification Search
CPC .......... C09D 5/1681; Y10T 428/24802; Y10T 428/13; Y10T 428/24355
(Continued)

(56) References Cited

U.S. PATENT DOCUMENTS

| 4,069,933 A | 1/1978 | Newing |
| 4,125,152 A | 11/1978 | Kestner et al. |

(Continued)

FOREIGN PATENT DOCUMENTS

| CN | 1721030 A | 1/2006 |
| CN | 100344341 C | 10/2007 |

(Continued)

OTHER PUBLICATIONS

International Preliminary Report on Patentability (Chapter II) for application PCT/US2014/066227 dated Feb. 2, 2016.
(Continued)

*Primary Examiner* — Michael C Miggins
(74) *Attorney, Agent, or Firm* — Wolf, Greenfield & Sacks, P.C.

(57) ABSTRACT

In certain embodiments, the invention is directed to apparatus comprising a liquid-impregnated surface, said surface comprising an impregnating liquid and a matrix of solid features spaced sufficiently close to stably contain the impregnating liquid therebetween or therewithin, and methods thereof. In some embodiments, one or both of the following holds: (i) $0 < \phi \leq 0.25$, where $\phi$ is a representative fraction of the projected surface area of the liquid-impregnated surface corresponding to non-submerged solid at equilibrium; and (ii) $S_{ow(a)} < 0$, where $S_{ow(a)}$ is spreading coefficient, defined as $\gamma_{wa} - \gamma_{wo} - \gamma_{oa}$, where $\gamma$ is the interfacial tension between the two phases designated by subscripts w, a, and o, where w is water, a is air, and o is the impregnating liquid.

15 Claims, 6 Drawing Sheets

Related U.S. Application Data (60) Provisional application No. 61/728,219, filed on Nov. 19, 2012.

(58) Field of Classification Search
USPC .................................. 428/34.1, 195.1, 141
See application file for complete search history.

(56) References Cited

U.S. PATENT DOCUMENTS

| | | |
|---|---|---|
| 4,204,021 A | 5/1980 | Becker |
| 4,316,745 A | 2/1982 | Blount |
| 4,503,099 A | 3/1985 | Chang et al. |
| 4,780,211 A | 10/1988 | Lien |
| 5,083,606 A | 1/1992 | Brown et al. |
| 5,133,516 A | 7/1992 | Marentic et al. |
| 5,154,741 A | 10/1992 | da Costa Filho |
| 5,624,713 A | 4/1997 | Ramer |
| 5,816,280 A | 10/1998 | Rojey et al. |
| 5,817,898 A | 10/1998 | Delion et al. |
| 5,853,802 A | 12/1998 | Boyer et al. |
| 5,900,516 A | 5/1999 | Talley et al. |
| 5,936,040 A | 8/1999 | Costello et al. |
| 5,955,165 A | 9/1999 | Zamora et al. |
| 6,028,234 A | 2/2000 | Heinemann et al. |
| 6,093,862 A | 7/2000 | Sinquin et al. |
| 6,216,472 B1 | 4/2001 | Cathenaut et al. |
| 6,247,603 B1 | 6/2001 | Farrell et al. |
| 6,329,490 B1 | 12/2001 | Yamashita et al. |
| 6,389,820 B1 | 5/2002 | Rogers et al. |
| 6,649,266 B1 | 11/2003 | Gross et al. |
| 7,041,363 B2 | 5/2006 | Krohmer et al. |
| 7,323,221 B2 | 1/2008 | Heppekausen et al. |
| 7,458,384 B1 | 12/2008 | Seal et al. |
| 7,597,148 B2 | 10/2009 | O'Malley et al. |
| 7,622,197 B2 | 11/2009 | Balow et al. |
| 7,687,593 B2 | 3/2010 | Yamahiro et al. |
| 7,722,951 B2 | 5/2010 | Li et al. |
| 7,887,934 B2 | 2/2011 | Gentleman et al. |
| 7,892,660 B2 | 2/2011 | Gentleman et al. |
| 7,897,271 B2 | 3/2011 | Gentleman et al. |
| 7,901,798 B2 | 3/2011 | Gentleman et al. |
| 7,977,267 B2 | 7/2011 | Gentleman et al. |
| 7,985,451 B2 | 7/2011 | Luzinov et al. |
| 8,003,178 B2 | 8/2011 | Kim et al. |
| 8,057,922 B2 | 11/2011 | Gentleman et al. |
| 8,057,923 B2 | 11/2011 | Gentleman et al. |
| 8,062,775 B2 | 11/2011 | Gentleman et al. |
| 8,173,279 B2 | 5/2012 | Gentleman et al. |
| 8,178,219 B2 | 5/2012 | Gentleman et al. |
| 8,222,172 B2 | 7/2012 | Gentleman et al. |
| 8,235,096 B1 | 8/2012 | Mahefkey et al. |
| 8,236,432 B2 | 8/2012 | Gentleman et al. |
| 8,252,259 B2 | 8/2012 | Seal et al. |
| 8,377,390 B1 | 2/2013 | Brueck et al. |
| 8,535,779 B1 | 9/2013 | Smith et al. |
| 8,574,704 B2 | 11/2013 | Smith et al. |
| 8,859,090 B2 | 10/2014 | Angelescu et al. |
| 8,940,361 B2 | 1/2015 | Smith et al. |
| 9,121,306 B2 * | 9/2015 | Aizenberg ............... B05D 5/00 |
| 9,254,496 B2 | 2/2016 | Dhiman et al. |
| 9,309,162 B2 | 4/2016 | Azimi et al. |
| 9,371,173 B2 | 6/2016 | Smith et al. |
| 9,381,528 B2 | 7/2016 | Dhiman et al. |
| 9,625,075 B2 | 4/2017 | Smith et al. |
| 10,882,085 B2 | 1/2021 | Smith et al. |
| 10,968,035 B2 | 4/2021 | Smith et al. |
| 11,058,803 B2 | 7/2021 | Smith et al. |
| 2002/0146540 A1 | 10/2002 | Johnston et al. |
| 2002/0164443 A1 | 11/2002 | Oles et al. |
| 2003/0017303 A1 | 1/2003 | Sindo et al. |
| 2003/0037914 A1 | 2/2003 | Inbe et al. |
| 2003/0096083 A1 | 5/2003 | Morgan et al. |
| 2003/0134035 A1 | 7/2003 | Lamb et al. |
| 2003/0203117 A1 | 10/2003 | Bartkowiak et al. |
| 2003/0226806 A1 | 12/2003 | Young et al. |
| 2004/0003619 A1 | 1/2004 | Lee et al. |
| 2004/0026832 A1 | 2/2004 | Gier et al. |
| 2004/0037961 A1 | 2/2004 | Dileman et al. |
| 2004/0219373 A1 | 11/2004 | Deruelle et al. |
| 2004/0243249 A1 | 12/2004 | Ishihara et al. |
| 2005/0003146 A1 | 1/2005 | Spath |
| 2005/0009953 A1 | 1/2005 | Shea |
| 2005/0016489 A1 | 1/2005 | Endicott et al. |
| 2005/0061221 A1 | 3/2005 | Paszkowski |
| 2005/0112326 A1 | 5/2005 | Nun et al. |
| 2005/0136217 A1 | 6/2005 | Barthlott et al. |
| 2005/0208272 A1 | 9/2005 | Groll |
| 2006/0007515 A1 | 1/2006 | Simonian et al. |
| 2006/0013735 A1 | 1/2006 | Engelking et al. |
| 2006/0078724 A1 | 4/2006 | Bhushan et al. |
| 2006/0147675 A1 | 7/2006 | Nun et al. |
| 2006/0204738 A1 | 9/2006 | Dubrow et al. |
| 2006/0240218 A1 | 10/2006 | Parce |
| 2006/0246226 A1 | 11/2006 | Dai et al. |
| 2007/0026193 A1 | 2/2007 | Luzinov et al. |
| 2007/0031639 A1 | 2/2007 | Hsu et al. |
| 2007/0135602 A1 | 6/2007 | Yamahiro et al. |
| 2007/0207335 A1 | 9/2007 | Karandikar et al. |
| 2007/0231542 A1 | 10/2007 | Deng et al. |
| 2007/0282247 A1 | 12/2007 | Desai et al. |
| 2007/0298216 A1 | 12/2007 | Jing et al. |
| 2008/0026505 A1 | 1/2008 | Chakrapani |
| 2008/0085070 A1 | 4/2008 | Hirata et al. |
| 2008/0118763 A1 | 5/2008 | Balow et al. |
| 2008/0145631 A1 | 6/2008 | Bhate et al. |
| 2008/0213461 A1 | 9/2008 | Gill et al. |
| 2008/0225378 A1 | 9/2008 | Weikert et al. |
| 2009/0124520 A1 | 5/2009 | Tohidi |
| 2009/0155609 A1 | 6/2009 | Gentleman et al. |
| 2009/0185867 A1 | 7/2009 | Masters et al. |
| 2009/0211735 A1 | 8/2009 | Stenkamp et al. |
| 2009/0231273 A1 | 9/2009 | Lashina et al. |
| 2009/0289213 A1 | 11/2009 | Pipper |
| 2010/0004373 A1 | 1/2010 | Zhu et al. |
| 2010/0028604 A1 | 2/2010 | Bhushan et al. |
| 2010/0028615 A1 | 2/2010 | Hwang et al. |
| 2010/0092621 A1 | 4/2010 | Akutsu et al. |
| 2010/0098909 A1 | 4/2010 | Reyssat et al. |
| 2010/0112286 A1 | 5/2010 | Bahadur et al. |
| 2010/0135949 A1 | 6/2010 | Ou-Yang |
| 2010/0143620 A1 | 6/2010 | Ajdelsztajn et al. |
| 2010/0147441 A1 | 6/2010 | Nakagawa et al. |
| 2010/0151197 A1 | 6/2010 | Gentleman et al. |
| 2010/0180952 A1 | 7/2010 | Verhelst et al. |
| 2010/0200094 A1 | 8/2010 | Ermakov |
| 2010/0218517 A1 | 9/2010 | Luther |
| 2010/0285229 A1 | 11/2010 | Elbahri et al. |
| 2010/0285275 A1 | 11/2010 | Baca et al. |
| 2010/0307922 A1 | 12/2010 | Wu |
| 2010/0330146 A1 | 12/2010 | Chauhan et al. |
| 2010/0330340 A1 | 12/2010 | Rothstein et al. |
| 2011/0003143 A1 | 1/2011 | Sugimoto et al. |
| 2011/0042850 A1 | 2/2011 | Hong et al. |
| 2011/0077172 A1 | 3/2011 | Aizenberg et al. |
| 2011/0094883 A1 | 4/2011 | Ito et al. |
| 2011/0106504 A1 | 5/2011 | Noureldin |
| 2011/0201984 A1 | 8/2011 | Dubrow et al. |
| 2011/0226998 A1 | 9/2011 | Van De Weijer-Wagemans et al. |
| 2011/0240130 A1 | 10/2011 | Den Dulk et al. |
| 2011/0283778 A1 | 11/2011 | Angelescu et al. |
| 2011/0287217 A1 | 11/2011 | Mazumder et al. |
| 2012/0000848 A1 | 1/2012 | Lyons et al. |
| 2012/0000853 A1 | 1/2012 | Tuteja et al. |
| 2012/0036846 A1 | 2/2012 | Aizenberg et al. |
| 2012/0128963 A1 | 5/2012 | Mao et al. |
| 2012/0248020 A1 | 10/2012 | Granick et al. |
| 2013/0003258 A1 | 1/2013 | Xie et al. |
| 2013/0032316 A1 | 2/2013 | Dhiman et al. |
| 2013/0034695 A1 | 2/2013 | Smith et al. |
| 2013/0062285 A1 | 3/2013 | Hoek et al. |
| 2013/0122225 A1 | 5/2013 | Azimi et al. |
| 2013/0123389 A1 | 5/2013 | Zhu et al. |
| 2013/0146536 A1 | 6/2013 | Tarabara et al. |
| 2013/0220813 A1 | 8/2013 | Anand et al. |

(56) References Cited

U.S. PATENT DOCUMENTS

| | | |
|---|---|---|
| 2013/0227972 A1 | 9/2013 | Hatton et al. |
| 2013/0251769 A1 | 9/2013 | Smith et al. |
| 2013/0251942 A1 | 9/2013 | Azimi et al. |
| 2013/0251946 A1 | 9/2013 | Azimi et al. |
| 2013/0251952 A1 | 9/2013 | Smith et al. |
| 2013/0302405 A1 | 11/2013 | Takaha et al. |
| 2013/0333789 A1 | 12/2013 | Smith et al. |
| 2013/0335697 A1 | 12/2013 | Smith et al. |
| 2013/0337027 A1 | 12/2013 | Smith et al. |
| 2013/0340840 A1 | 12/2013 | Anand et al. |
| 2014/0141263 A1 | 5/2014 | Jones et al. |
| 2014/0147627 A1 | 5/2014 | Aizenberg et al. |
| 2014/0178611 A1 | 6/2014 | Smith et al. |
| 2014/0290699 A1 | 10/2014 | Bengaluru Subramanyam et al. |
| 2014/0291420 A1 | 10/2014 | Dhiman et al. |
| 2015/0111063 A1 | 4/2015 | Khan et al. |
| 2015/0125575 A1 | 5/2015 | Smith et al. |
| 2015/0179321 A1 | 6/2015 | Kahlil et al. |
| 2015/0306642 A1 | 10/2015 | Smith et al. |
| 2016/0150793 A1 | 6/2016 | Cordero et al. |
| 2016/0296985 A1 | 10/2016 | Dhiman et al. |
| 2017/0144828 A1 | 5/2017 | Smith et al. |
| 2017/0151575 A1 | 6/2017 | Dhiman et al. |
| 2018/0050133 A1 | 2/2018 | Smith et al. |
| 2018/0161836 A1 | 6/2018 | Anand et al. |
| 2018/0180364 A1 | 6/2018 | Dhiman et al. |
| 2019/0100353 A1 | 4/2019 | Subramanyam et al. |
| 2019/0224695 A1 | 7/2019 | Dihman et al. |

FOREIGN PATENT DOCUMENTS

| | | |
|---|---|---|
| CN | 102002298 A | 4/2011 |
| CN | 101269960 B | 5/2011 |
| CN | 102790021 | 11/2012 |
| DE | 19818956 A1 | 11/1998 |
| EP | 0230112 A2 | 7/1987 |
| EP | 0980747 A2 | 2/2000 |
| EP | 1750018 A2 | 2/2007 |
| EP | 1892458 A1 | 2/2008 |
| EP | 2163295 A1 | 3/2013 |
| JP | S60-75236 A | 4/1985 |
| JP | H01-170932 A | 7/1989 |
| JP | H05-240251 A | 9/1993 |
| JP | 2002-120861 | 4/2002 |
| JP | 2004-037764 A | 2/2004 |
| JP | 2006-143988 A | 6/2006 |
| JP | 2007-215620 | 8/2007 |
| JP | 2007-215620 A | 8/2007 |
| JP | 2007-278090 A | 10/2007 |
| JP | 2008-223003 A | 9/2008 |
| JP | 2008-240910 A | 10/2008 |
| JP | 2009-241943 A | 10/2009 |
| JP | 2010-167929 A | 8/2010 |
| JP | 2011-500150 | 1/2011 |
| JP | 2011-500150 A | 1/2011 |
| JP | 2011-126080 A | 6/2011 |
| JP | 2013-166811 A | 8/2013 |
| JP | 2013-168399 A | 8/2013 |
| KR | 10-2009-0020008 A | 2/2009 |
| TW | I233968 B | 6/2005 |
| WO | WO 1993/17077 A1 | 9/1993 |
| WO | WO 1999/36490 A1 | 7/1999 |
| WO | WO 2001/38288 A1 | 5/2001 |
| WO | WO 2002/62568 A2 | 8/2002 |
| WO | WO 2003/13827 A1 | 2/2003 |
| WO | WO 2003/71275 A1 | 8/2003 |
| WO | WO 2003/087604 A1 | 10/2003 |
| WO | WO 2006/017009 A2 | 2/2006 |
| WO | WO 2006/091235 A1 | 8/2006 |
| WO | WO 2006/132892 A2 | 12/2006 |
| WO | WO 2007/019362 A1 | 2/2007 |
| WO | WO 2008/111603 A1 | 9/2008 |
| WO | WO 2009/009185 A2 | 1/2009 |
| WO | WO 2009/048645 A2 | 4/2009 |
| WO | WO 2010/028752 A1 | 3/2010 |
| WO | WO 2010/082710 A1 | 7/2010 |
| WO | WO 2010/096073 A1 | 8/2010 |
| WO | WO 2010/129807 A1 | 11/2010 |
| WO | WO 2011/087458 A1 | 7/2011 |
| WO | WO 2011/143371 A1 | 11/2011 |
| WO | WO 2012/024099 A1 | 2/2012 |
| WO | WO 2012/100099 A2 | 7/2012 |
| WO | WO 2012/100100 A2 | 7/2012 |
| WO | WO 2013/022467 A2 | 2/2013 |
| WO | WO 2013/130118 A1 | 9/2013 |
| WO | WO 2013/141888 A1 | 9/2013 |
| WO | WO 2013/141953 A2 | 9/2013 |
| WO | WO 2013/177579 A2 | 11/2013 |
| WO | WO 2014/123217 A1 | 8/2014 |

OTHER PUBLICATIONS

International Preliminary Report on Patentability (Chapter II) for application PCT/US2013/070827 dated Feb. 10, 2015.
International Search Report and Written Opinion for application PCT/US2011/061498 dated Jul. 31, 2012.
International Search Report and Written Opinion for application PCT/US2011/061898 dated Apr. 24, 2013.
International Search Report and Written Opinion for application PCT/US2012/030370 dated Oct. 15, 2012.
International Search Report and Written Opinion for application PCT/US2012/042327 dated May 16, 2013.
International Search Report and Written Opinion for application PCT/US2013/021558 dated Oct. 11, 2013.
International Search Report and Written Opinion for application PCT/US2013/042771 dated May 26, 2014.
International Search Report and Written Opinion for application PCT/US2012/042326 dated Dec. 3, 2012.
International Search Report and Written Opinion for application PCT/US2013/045731 dated Nov. 12, 2013.
International Search Report and Written Opinion for application PCT/US2013/070827 dated Mar. 27, 2014.
International Search Report and Written Opinion for application PCT/US2013/028439 dated Dec. 5, 2013.
International Search Report and Written Opinion for application PCT/US2012/065627 dated Mar. 8, 2013.
International Search Report and Written Opinion for application PCT/US2011/049187 dated Jan. 23, 2013.
International Search Report and Written Opinion for application PCT/US2014/066227 dated Mar. 3, 2015.
International Search Report and Written Opinion for application PCT/US2014/019532 dated Nov. 25, 2014.
[No Author Listed], Fluorinert Liquids for Electronics Manufacturing. 2003. 3M Corporation. 4 pages.
[No Author Listed], Furaipan curabu (frying pan club). Nov. 21, 2011. Last accessed on Nov. 3, 2016 from <https://www.furaipan.com/kaigi/11/1121.shtml>. 3 pages.
[No Author Listed], How much is left in that container? Consumer reports. Sep. 2009. Last accessed on May 21, 2015 at <http://www.consumerreports.org/cro/magazine-archive/september-2009/personal-finance/good-to-the-last-drop/overview/good-to-the-last-drop-ov.htm?view=print>. 2 pages.
[No Author Listed], Liquiglide gets it all out. Packaging News. Mar. 30, 2015. Last accessed on May 21, 2015 at <http://www.packagingnews.com.au/news/liquiglide-gets-it-all-out>. 4 pages.
[No Author Listed], LiquiGlide Lets Food Slide Out of Packaging with Ease. Food Processing. 2014. Last accessed on May 21, 2015 at <http://www.foodprocessing.com/vendors/products/2014/liquiglide-lets-food-slide-out-of-packaging-with-ease>. 6 pages.
[No Author Listed], Liquiglide's Coatings Ensure Evacuation of Viscous Formulations. Beauty Packaging. Aug. 4, 2014. Last accessed on May 21, 2015 at <http://www.beautypackaging.com/issues/2014-08/view_design-center/liquiglides-coatings-ensure-evacuation-of-viscous-formulations/>. 1 page.
[No Author Listed], Scientists Develop Super-Slippery Material. Slashdot. Original Nov. 14, 2011 post with public comments. Last accessed on Nov. 3, 2016 from <https://science.slashdot.org/story/11/11/14/0437204/scientists-develop-super-slippery-material>. 11 pages.

(56) References Cited

OTHER PUBLICATIONS

[No Author Listed], Super Slippery surface processing Harvard University Development. Science SRAD. Original Nov. 17, 2011 post with public comments. Last accessed on Nov. 3, 2016 from <http://science.srad.jp/story/11/11/17/0037255/>. 8 pages.
[No Author Listed], What is fluid? Heishin Ltd. 2014. Last accessed on Nov. 3, 2016 from <http://www.mohno-pump.co.jp/learning/manabiya/c2b.html>. 2 pages.
Allain et al., A New Method for Contact-Angle Measurements of Sessile Drops. Journal of Calloid and Interface Science. Sep. 1985;107(1):5-13.
Anand et al., Enhanced condensation on lubricant-impregnated nanotextured surfaces. ACS Nano. Nov. 27, 2012;6(11):10122-9. doi: 10.1021/nn303867y.
Antonini et al., Water drops dancing on ice: how sublimation leads to drop rebound. Phys Rev Lett. Jul. 5, 2013;111(1):014501-1-5.
Arkles, Hydrophobicity, Hydrophilicity and Silanes. Paint and Coatings Industry. Oct. 1, 2006;114-35.
Ashkin et al., Optical levitation by radiation pressure. Applied Physics Letters. 1971;19(8):283-5.
Ashkin et al., Optical levitation of liquid drop by radiation pressure. Science. 1975;187(4181):1073-5.
Avedisian et al., Leidenfrost boiling of methanol droplets on hot porous/ceramic surfaces. International Journal of Heat and Mass Transfer. 1987;30(2):379-93.
Azimi et al., Hydrophobicity of rare-earth oxide ceramics. Nat Mater. Apr. 2013;12(4):315-20. doi: 10.1038/nmat3545. Epub Jan. 20, 2013.
Baier et al., Propulsion Mechanisms for Leidenfrost Solids on Ratchet Surfaces. arXiv preprint arXiv: 1208.5721 (2012). 5 pages.
Bargir et al., The use of contact angle measurements to estimate the adhesion propensity of calcium carbonate to solid substrates in water. Applied Surface Science. 2009;255:4873-9.
Barnes, The Potential for Monolayers to Reduce the Evaporation of Water from Large Water Storages. Agricultural Water Management. 2008;95(4):339-53.
Bauer et al., The insect-trapping rim of Nepenthes pitchers: surface structure and function. Plant Signaling & Behavior. 2009;4(11):1019-23.
Beaugnon et al., Dynamics of magnetically levitated droplets. Physica B. 2001;294-295:715-20.
Betz et al., Do surfaces with mixed hydrophilic and hydrophobic areas enhance pool boiling? Applied Physics Letters. 2010;97:141909-1-3.
Biance et al., Leidenfrost drops. Physics of Fluids. 2003;15(6):1632-7.
Bico et al., Pearl drops. Europhysics Letters. 1999;47(2):220-6.
Bird et al., Reducing the contact time of a bouncing drop. Nature. Nov. 21, 2013;503(7476):385-8. doi: 10.1038/nature12740.
Blossey, Self-cleaning surfaces—Virtual realities. Nature Materials. 2003;2(5):301-6.
Bohn et al., Insect aquaplaning: Nepenthes pitcher plants capture prey with the peristome, a fully wettable water-lubricated anisotropic surface. Proc Natl Acad Sci U S A. Sep. 28, 2004;101(39):14138-43.
Burton et al., Geometry of the Vapor Layer Under a Leidenfrost Drop. Physical Review Letters. 2012;109(7):074301. 4 pages.
Cao et al., Anti-Icing Superhydrophobic Coatings. Langmuir Letter. 2009;25(21):12444-8.
Cassie et al., Wettability of porous surfaces. Transactions of the Faraday Society. 1944;40:546-51.
Celestini et al., Take Off of Small Leidenfrost Droplets. Physical Review Letters. 2012;109(3):034501-1-5.
Chandra et al., Leidenfrost evaporation of liquid nitrogen droplets. Transactions of the ASME: Journal of Heat Transfer. 1994;116(4):999-1006.
Chandra et al., Observations of droplet impingement on a ceramic porous surface. International Journal of Heat and Mass Transfer. 1992;35(10):2377-88.
Chaudhuri et al., Dynamic contact angles on PTFE surface by aqueous surfactant solution in the absence and presence of electrolytes. J Colloid Interface Sci. Sep. 15, 2009;337(2):555-62. doi: 10.1016/j.jcis.2009.05.033. Epub May 21, 2009.
Chen et al., A Wettability Switchable Surface by Microscale Surface Morphology Change. Journal of Micromechanics & Microengineering. Institute of Physics Publishing. 2007;17(3):489-95.
Cummings et al., Oscillations of magnetically levitated aspherical droplets. Journal of Fluid Mechanics. 1991;224:395-416.
Deng et al., Nonwetting of impinging droplets on textured surfaces. Applied Physics Letters. 2009;94(13):133109-1-3.
Dickerson, Incredible new invention has solved a universally annoying problem. Business Insider. Mar. 23, 2015. Accessed on May 21, 2015 at <http://www.businessinsider.com/liquiglide-nonstick-coating-on-bottles-2015-3>. 4 pages.
Eck et al., Growth and thermal properties of ultrathin cerium oxide layers on RH(111). Surface Science. 2002;520:173-85.
Elbahri et al., Anti-lotus effect for nanostructuring at the leidenfrost temperature. Advance Materials. 2007; 19(9):1262-6.
Feng et al., Design and creation of superwetting/antiwetting surfaces. Advanced Materials. 2006;18(23):3063-78.
Fondecave et al., Polymers as Dewetting Agents. Macromolecules. 1998;31:9305-15.
Fujimoto et al., Deformation and rebounding processes of a water droplet impinging on a flat surface above Leidenfrost temperature. Journal of Fluids Engineering. Transactions of the ASME—Journal of Fluids Engineering. 1996;118(1):142-9.
Furmidge, Studies at Phase Interfaces. Journal of Colloid Science. 1962;17:309-24.
Gao et al., Artificial lotus leaf prepared usinga 1945 patent and a commercial textile. Langmuir. 2006;22(14):5998-6000.
Goldshtik et al., A liquid drop on an air cushion as an analogue of Leidenfrost boiling. Journal of Fluid Mechanics. 1986;166:1-20.
Good, Contact angle, wetting and adhesion: a critical review. J. Adhesion Sci. Technol. 1992;6(12):1269-302.
Grace, Energy from Gas Hydrates: Assessing the Opportunities and Challenges for Canada. Council of Canadian Academies. Jul. 2008. 8 pages.
Gradeck et al., Heat transfer for Leidenfrost drops bouncing onto hot surface. Experimental Thermal and Fluid Science. 2013;47:14-25.
Hashmi et al., Leidenfrost levitation: beyond droplets. Sci Rep. 2012;2:797. doi: 10.1038/srep00797. 4 pages.
Hejazi et al., Wetting Transition in Two-, Three-, and Four-Phase Systems. Langmuir. 2012;28:2173-80.
Hirano, A study of Burning of Iron Fryingpan in Cooking. Journal of Home Economics of Japan. 1977;28(6):398-402.
Holden et al., The Use of Organic Coating to Promote Dropwise Condensation of Steam. Journal of Heat Transfer. 1987;109:768-74.
Iwasa et al., Electromaglev—Magnetic levitation of superconducting disc with a DC field generated by electromagnets: Part 1. Theoretical and experimental results on operating modes, lift-to-weight ratio, and suspension stiffness. Cryogenics. 1997;37(12):807-16.
Jung et al., Are Superhydrophobic Surfaces Best for Icephobicity? Langmuir. 2011;27(6):3059-66.
Kazi et al., Mineral Scale Formation and Mitigation on Metals and a Polymeric Heat Exchanger Surface. Applied Thermal Engineering. 2010;30:2236-42.
Kazi, Heat Exchangers—Basics Design Applications. Chapter 19—Fouling and Fouling Mitigation on Heat Exchanger Surfaces. InTech. Ed. Jovan Mitrovic. Mar. 2012:507-32.
Kim et al., Hierarchical or not? Effect of the length scale and hierarchy of the surface roughness on omniphobicity of lubricant-infused substrates. Nano Letters. 2013;13(4):1793-9.
Kim et al., Levitation Time Measurement of Water Drops on the Surface of Liquid Nitrogen. Journal of the Korean Physical Society. Jun. 2011;58(6):1628-32.
Kim, Floating Phenomenon of a Water Drop on the Surface of Liquid Nitrogen. Journal of the Korean Physical Society. Oct. 2006;49(4):L1335-8.
King, MIT Bottle Coating Offers Promising Solution to Product Waste. Sustainable Brands. Jul. 9, 2012. Accessed on May 21, 2015

(56) References Cited

OTHER PUBLICATIONS at <http://www.sustainablebrands.com/new_and_views/articles/mit-bottle-coating-offers-promising-solution-product-waste>. 2 pages.
Kulinich et al., Ice Adhesion on Super-Hydrophobic Surfaces. Applied Surface Science. 2009;225:8153-7.
Lafuma et al., Slippery Pre-Suffused Surfaces. EPL. 2011;96:56001-1-4.
Lagubeau et al., Leidenfrost on a ratchet. Nature Physics. 2011;7(5):395-8.
Lee et al., Dynamic Wetting and Spreading Characteristics of a Liquid Droplet Impinging on Hydrophobic Textured Surfaces. Langmuir. 2011;27:6565-73.
Leidenfrost, On the fixation of water in diverse fire. International Journal of Heat and Mass Transfer. 1966;9(11):1153-66.
Li et al., Dynamic Behavior of the Water Droplet Impact on a Textured Hydrophobic/Superhydrophobic Surface: The Effect of the Remaining Liquid Film Arising on the Pillars' Tops on the Contact Time. Langmuir. 2010;26(7):4831-8.
Linke et al., Self-propelled leidenfrost droplets. Physical Review Letters. 2006;96(15):154502-1-4.
Liu et al., Extreme wettability and tunable adhesion: biomimicking beyond nature? Soft Matter. 2012;8:2070-86.
Liu et al., Metallic Surfaces with Special Wettability. Nanoscale. 2011;3:825-38.
Marcus, Ions in Water and Biphysical Implications. 4.2: Surface Between Water and Another Liquid. 2012. p. 147. Table 4.1.
Marin et al., Capillary droplets on Leidenfrost micro-ratchets. arXiv preprint. arXiv: 1210.4978. 2012. 9 pages.
Masubuchi, Interesting Rheology. Gijutsuhyoronsha. Jul. 25, 2010. pp. 104-106.
Matolin et al., Growth of ultra-thin cerium oxide layers on Cu(111). Surface Science. 2007;254:153-5.
Meuler et al., Exploiting Topographical Texture To Impact Icephobicity. ACS Nano. 2010;4(12):7048-52.
Mills, Pillow lavas and the Leidenfrost effect. Journal of the Geological Society. 1984;141(1):183-6.
Mishchenko et al., Design of ice-free nanostructured surfaces based on repulsion of impacting water droplets. ACS Nano. 2010;4(12):7699-707.
Mullins et al., Ordered cerium oxide thin films grown on Ru(0001) and Ni(111). Surface Science. 1999;429:186-98.
Nosonovsky et al., Multiscale effects and capillary interactions in functional biomimetic surfaces for energy conversion and green engineering. Phil. Trans. R. Soc. A. 2009;367:1511-39.
Onda et al., Super-water-repellent fractal surfaces. Langmuir. 1996;12(9):2125-7.
Ou et al., Laminar drag reduction in microchannels using ultrahydrophobic surfaces. Physics of Fluids. 2004;16(12):4635-43.
Park et al., A Numerical Study of the Effects of Superhydrophobic Surface on Skin-Friction Drag in Turbulent Channel Flow. Phys. Fluids. 2013;25:110815-1-11.
Piroird et al., Magnetic control of Leidenfrost drops. Physical Review E—Statistical, Nonlinear, and Soft Matter Physics. 2012;85(5):056311-1-4.
Pozzato et al., Superhydrophobic surfaces fabricated by nanoimprint lithography. Microelectronic Engineering. 2006;83:884-88.
Prat et al., On the effect of surface roughness on the vapor flow under Leidenfrost-Levitated droplets. Journal of Fluids Engineering. Transactions of the ASME—Journal of Fluids Engineering. 1995;117(3):519-25.
Quéré et al., Surfing the hot spot. Nature Materials. 2006;5(6):429-30.
Quéré, Leidenfrost dynamics. Annu. Rev. Fluid Mech. 2013:197-215.
Quéré, Non-sticking drops. Institute of Physics Publishing. Rep. Prog. Phys. 2005;68(11):2495-532.
Rausch et al., On the characteristics of Ion Implanted Metallic Surfaces Inducing Dropwise Condensation of Steam. Langmuir. 2010;26(8):5971-5.

Reyssat et al., Bouncing transitions on microtextured materials. Europhysics Letters. 2006;74(2):306-12.
Reyssat et al., Dynamical superhydrophobicity. Faraday Discussions. 2010;146:19-33.
Richard et al., Contact time of a bouncing drop. Nature. Jun. 20, 2002;417(6891):811-2.
Roosen et al., Optical levitation by means of two horizontal laser beams: a theoretical and experimental study. Physics Letters. 1976;59A(1):6-8.
Rothstein, Slip on superhydrophobic surfaces. Annual Review of Fluid Mechanics. 2010;42(1):89-109.
Rykaczewski et al., Mechanism of frost formation on lubricant-impregnated surfaces. Langmuir. Apr. 30, 2013;29(17):5230-8. doi: 10.1021/la400801s.
Santos et al., Modified Stainless Steel Surfaces Targeted to Reduce Fouling. J. Food Engineering. 2004;64:63-79.
Schierbaum et al., Ordered ultra-thin cerium oxide overlayers on Pt(111) single crystal surfaces studied by LEED and XPS. Surface Science. 1998;399:29-38.
Seiwert et al., Coating of a Textured Solid. J. Fluid Mech. 2011;669:55-63.
Sekeroglu et al., Transport of a soft cargo on a nanoscale ratchet. Applied Physics Letters. 2011;99(6):063703-1-3.
Sloan, Jr., Fundamental Principles and Applications of Natural Gas Hydrates. Nature Publishing Group. 2003:353-9.
Smith et al., Droplet Mobility on Lubricant-Impregnated Surfaces. Soft Matter. 2013;9:1772-80.
Smith, Liquid-encapsulating surfaces: overcoming the limitations of superhydrophobic surfaces for robust non-wetting and anti-icing surfaces. Bulleting of the American Physical Society. 2011. Abstract Only.
Snoeijer et al., Maximum size of drops levitated by an air cushion. Physical Review E—Statistical, Nonlinear, and Soft Matter Physics. 2009;79(3). 13 pages.
Song et al., Superhydrophobic Surfaces Produced by Applying a Self-Assembled Monolyaer to Silicon Micro/Nano-Textured Surfaces. Nano Research. 2009;2:143-50.
Song et al., Vitrification and levitation of a liquid droplet on liquid nitrogen. PNAS Early Edition. 2010:1-5.
Sum et al., Clathrate Hydrates: From Laboratory Science to Engineering Practice. American Chemical Society Ind. Eng. Chem. Res. Jul. 22, 2009;48(16):7457-65.
Sutara et al., Epitaxial growth of continuous CeO2(111) ultra-thin films on Cu(111). Thin Solid Films. 2008;516:6120-4.
Trinh et al., The dynamics of ultrasonically levitated drops in an electric field. Physics of Fluids. 1996;8(1)43-61.
Tropmann et al., Completely superhydrophobic PDMS surfaces for microfluidics. Langmuir. Jun. 5, 2012;28(22):8292-5. doi: 10.1021/la301283m. Epub May 21, 2012.
Tuteja et al., Designing superoleophobic surfaces. Science. 2007;318(5856):1618-22.
Tuteja et al., Robust omniphobic surfaces. Proc Natl Acad Sci U S A. Nov. 25, 2008;105(47):18200-5. doi: 10.1073/pnas.0804872105.
Vakarelski et al., Drag reduction by leidenfrost vapor layers. Physical Review Letters. 2011;106(21):214501-1-4.
Vakarelski et al., Stabilization of Leidenfrost vapour layer by textured superhydrophobic surfaces. Nature. 2012;489(7415):274-7.
Varanasi et al., Frost formation and ice adhesion on superhydrophobic surfaces. Applied Physics Letters. 2010;97(23):234102-1-3.
Varanasi et al., Spatial Control in the Heterogeneous Nucleation of Water. Applied Physics Letters. 2009;95:094101-01-03.
Weber et al., Aero-acoustic levitation: A method for containerless liquid-phase processing at high temperatures. Review of Scientific Instruments. 1994;65(2):456-65.
Weickgenannt et al., Inverse-Leidenfrost phenomenon on nanofiber mats on hot surfaces. Physical Review E—Statistical, Nonlinear, and Soft Matter Physics. 2011;84(3):036310-1-9.
Weilert et al., Magnetic levitation and noncoalescence of liquid helium. Physical Review Letters. 1996;77(23):4840-3.
Welter et al., Acoustically levitated droplets—A new tool for micro and trace analysis. Fresenius Journal of Analytical Chemistry. 1997;357(3):345-50.

(56) References Cited

OTHER PUBLICATIONS

Wenzel, Resistance of Solid Surfaces to Wetting by Water. Industrial & Engineering Chemistry. 1936;28(8):988-94.
Wong et al., Bioinspired Self-Repairing Slippery Surfaces with Pressure-Stable Omniphobicity. Nature. 2011;477(7365):443-7.
Wong et al., Bioinspired Self-Repairing Slippery Surfaces with Pressure-Stable Omniphobicity. Nature. 2011;477(7365):443-7. Supplementary Information Included.
Würger, Leidenfrost gas ratchets driven by thermal creep. Physical Review Letters. 2011;107(16). 4 pages.
Yarin et al., On the acoustic levitation of droplets. Journal of Fluid Mechanics. 1998;356:65-91.
Yasuda et al., Levitation of metallic melt by using the simultaneous imposition of the alternating and the static magnetic fields. Journal of Crystal Growth. 2004;260(3-4):475-85.
Yu et al., Containerless solidification of oxide material using an electrostatic levitation furnace in microgravity. Journal of Crystal Growth. 2001;231(4):568-76.
Zhao et al., Dropwise condensation of Steam on Ion Implanted Condenser Surfaces. Heat Recovery Systems & CHP. 1994;14(5):525-34.
Dhiman et al., Rupture of thin films formed during droplet impact. Pro Royal Society. Apr. 2010;466(2116):1229-1245.

\* cited by examiner

APPARATUS AND METHODS EMPLOYING LIQUID-IMPREGNATED SURFACES

RELATED APPLICATIONS

This is a continuation of U.S. Non-Provisional application Ser. No. 14/084,126, filed Nov. 19, 2013, which claims the benefit of U.S. Provisional Patent Application No. 61/728,219, which was filed on Nov. 19, 2012, each incorporated herein by reference.

TECHNICAL FIELD

This invention relates generally to non-wetting and low adhesion surfaces. More particularly, in certain embodiments, the invention relates to non-wetting, liquid-impregnated surfaces that are engineered to eliminate pinning and/or to either avoid or induce cloaking.

BACKGROUND

The advent of micro/nano-engineered surfaces in the last decade has opened up new techniques for enhancing a wide variety of physical phenomena in thermofluids sciences. For example, the use of micro/nano surface textures has provided nonwetting surfaces capable of achieving less viscous drag, reduced adhesion to ice and other materials, self-cleaning, and water repellency. These improvements result generally from diminished contact (i.e., less wetting) between the solid surfaces and adjacent liquids.

One type of non-wetting surface of interest is a superhydrophobic surface. In general, a superhydrophobic surface includes micro/nano-scale roughness on an intrinsically hydrophobic surface, such as a hydrophobic coating. Superhydrophobic surfaces resist contact with water by virtue of an air-water interface within the micro/nano surface textures.

One of the drawbacks of existing non-wetting surfaces (e.g., superhydrophobic, superoleophobic, and supermetallophobic surfaces) is that they are susceptible to impalement, which destroys the non-wetting capabilities of the surface. Impalement occurs when an impinging liquid (e.g., a liquid droplet or liquid stream) displaces the air entrained within the surface textures. Previous efforts to prevent impalement have focused on reducing surface texture dimensions from micro-scale to nano-scale.

Although not well recognized in previous studies of liquid-impregnated surfaces, the impregnating liquid may spread over and "cloak" the contacting liquid (e.g., water droplets) on the surface. For example, cloaking can cause the progressive loss of impregnating liquid through entrainment in the water droplets as they are shed from the surface.

There is a need for non-wetting surfaces that are robust and/or deliver optimal non-wetting properties.

SUMMARY OF THE INVENTION

Described herein are non-wetting surfaces that include a liquid impregnated within a matrix of micro/nano-engineered features on the surface, or a liquid filling pores or other tiny wells on the surface. In certain embodiments, compared to previous non-wetting surfaces, which include a gas (e.g., air) entrained within the surface textures, these liquid-impregnated surfaces are resistant to impalement and frost formation, and are therefore more robust.

Impregnating fluids that cover the tops of the matrix of solid features offer a non-wetting benefit. However, at equilibrium, the impregnating liquid may not cover the tops of solid features (e.g., microposts or nanograss) of the surface without being continually replenished. Furthermore, while certain impregnating fluids do cover the tops of solid features, offering a non-wetting benefit, they often exhibit cloaking, and the impregnating fluid is depleted unless replenished.

It is discovered that liquid-impregnated surfaces can be engineered to provide resistance to impalement and to provide non-wettability, without requiring replenishment of impregnating fluid to make up for liquid lost to cloaking, and without requiring replenishment of impregnating liquid to maintain coverage over the tops of the solid features.

In one aspect, the invention includes an article comprising a liquid-impregnated surface, said surface comprising an impregnating liquid and a matrix of solid features spaced sufficiently close to stably contain the impregnating liquid therebetween or therewithin, wherein one or both of the following holds: (i) $0 < \phi \leq 0.25$, where $\phi$ is a representative fraction of the projected surface area of the liquid-impregnated surface corresponding to non-submerged solid at equilibrium; and (ii) $S_{ow(a)} < 0$, where $S_{ow(a)}$ is spreading coefficient, defined as $\gamma_{wa} - \gamma_{wo} - \gamma_{oa}$, where $\gamma$ is the interfacial tension between the two phases designated by subscripts w, a, and o, where w is water, a is air, and o is the impregnating liquid.

In certain embodiments, $\phi$ is in a range of 0 to 0.25. In certain embodiments, $\phi$ is in a range of 0 to 0.10. In certain embodiments, $\phi$ is in a range of 0.001 to 0.25. In certain embodiments, $\phi$ is in a range of 0.001 to 0.10.

In certain embodiments, $S_{ow(a)} < 0$.

In certain embodiments, the impregnating liquid comprises an ionic liquid (e.g., impregnating liquids that do not exhibit cloaking in the presence of air and water). Exemplary impregnating liquid includes at least one member selected from the group consisting of tetrachloroethylene (perchloroethylene), phenyl isothiocyanate (phenyl mustard oil), bromobenzene, iodobenzene, o-bromotoluene, alpha-chloronaphthalene, alpha-bromonaphthalene, acetylene tetrabromide, 1-butyl-3-methylimidazolium bis(trifluoromethylsulfonyl) imide (BMIm), tribromohydrin (1,2,3-tribromopropane), ethylene dibromide, carbon disulfide, bromoform, methylene iodide (diiodomethane), stanolax, Squibb's liquid petrolatum, p-bromotoluene, monobromobenzene, perchloroethylene, carbon disulfide, phenyl mustard oil, monoiodobenzene, alpha-monochloro-naphthalene, acetylene tetrabromide, aniline, butyl alcohol, isoamyl alcohol, n-heptyl alcohol, cresol, oleic acid, linoleic acid, and amyl phthalate.

In certain embodiments, the solid features include at least one member selected from the group consisting of a polymeric solid, a ceramic solid, a fluorinated solid, an intermetallic solid, and a composite solid. In certain embodiments, the solid features comprise a chemically modified surface, coated surface, surface with a bonded monolayer.

In certain embodiments, the solid features define at least one member selected from the group consisting of pores, cavities, wells, interconnected pores, and interconnected cavities. In certain embodiments, the solid features include at least one member selected from the group consisting of posts, nanoneedles, nanograss, substantially spherical particles, and amorphous particles.

In certain embodiments, the solid features have a roughened surface. In certain embodiments, the roughened surface provides stable impregnation of liquid therebetween or therewithin, such that $\theta_{os(v),\ receding} < \theta_c$.

In certain embodiments, the liquid-impregnated surface is configured such that water droplets contacting the surface are not pinned or impaled on the surface and have a roll-off angle α of less than 40° (e.g, for a 5 microliter droplet). In certain embodiments, the water droplets have a roll-off angle α of less than 25° (e.g., for a 5 microliter droplet).

In certain embodiments, $\theta_{os(v), receding} > 0$.

In another aspect, the invention includes an article comprising a liquid-impregnated surface, said surface comprising an impregnating liquid and a matrix of solid features spaced sufficiently close to stably contain the impregnating liquid therebetween or therewithin, wherein one or both of the following holds: (i) $\theta_{os(w), receding} = 0$ (e.g., useful for 3-phase systems such as inside a pipeline-impregnating liquid phase, solid phase, and pipeline liquid (e.g. oil) phase-specification will define $\theta_{os(w), receding}$); and (ii) $\theta_{os(v), receding} = 0$ and $\theta_{os(w), receding} = 0$ (e.g., useful for 4-phase systems such as surfaces exposed to liquid droplets in air-impregnating liquid phase, solid phase, droplet phase, air phase—specification will define $\theta_{os(w), receding}$ and $\theta_{os(v), receding}$). In certain embodiments, one or more previously described features may apply to various embodiments in this aspect of the invention.

In another aspect, the invention includes a method of utilizing a liquid-impregnated surface. The method includes the steps of: providing an article comprising a liquid-impregnated surface having 0<ϕ≤0.25 at equilibrium, where ϕ is a representative fraction of the projected surface area of the liquid-impregnated surface corresponding to non-submerged solid; and using the article at equilibrium or pseudo equilibrium. In certain embodiments, equilibrium is a relative term—e.g. some evaporation of impregnating liquid may be occurring, but the article is still considered to be "at equilibrium".

In certain embodiments, ϕ is a range of 0.001 to 0.25. In certain embodiments, ϕ is in a range of 0.01 to 0.25. In certain embodiments, at least one of the following holds: (i) $\theta_{os(v), receding} > 0$; and (ii) $\theta_{os(w), receding} > 0$. In certain embodiments, one or more previously described features may apply to various embodiments in this aspect of the invention.

In another aspect, the invention includes an article comprising a liquid-impregnated surface, said surface comprising an impregnating liquid and a matrix of solid features spaced sufficiently close to stably contain the impregnating liquid therebetween or therewithin, wherein one or both of the following holds: (i) $\theta_{os(v), receding} > 0$; and (ii) $\theta_{os(w), receding} > 0$.

In certain embodiments, both $\theta_{os(v), receding} > 0$ and $\theta_{os(w), receding} > 0$. In certain embodiments, one or more previously described features may apply to various embodiments in this aspect of the invention.

In another aspect, the invention includes an article comprising a liquid-impregnated surface, said surface comprising an impregnating liquid and a matrix of solid features spaced sufficiently close to stably contain the impregnating liquid therebetween or therewithin, wherein one or both of the following holds: (i) $\theta_{os(v), receding} < \theta_c$; and (ii) $\theta_{os(w), receding} < \theta_c$.

In another aspect, the invention includes an article comprising a liquid-impregnated surface, said surface comprising an impregnating liquid and a matrix of solid features spaced sufficiently close to stably contain the impregnating liquid therebetween or therewithin, wherein one or both of the following holds: (i) $\theta_{os(v), receding} < \theta^*_c$; and (ii) $\theta_{os(w), receding} < \theta^*_c$, where $\theta^*_c = \cos^{-1}(1/r)$, and where r is roughness of the solid portion of the surface. In certain embodiments, one or more previously described features may apply to various embodiments in this aspect of the invention.

In another aspect, the invention includes a method of utilizing a liquid-impregnated surface, the method comprising the steps of: providing an article described herein; and using the article at equilibrium or pseudo-equilibrium (e.g., wherein the properties specified in the claim hold true at equilibrium).

In certain embodiments, the article is used in a three-phase system. (e.g., impregnating liquid phase, solid surface phase, and contacting liquid phase, e.g., a pipeline). In certain embodiments, the article is used in a four-phase system (e.g., impregnating liquid phase, solid surface phase, droplet phase, and surrounding gas phase). In certain embodiments, the article is a pipeline or portion or coating thereof. In certain embodiments, the article is a member selected from the group consisting of a steam turbine part, a gas turbine part, an aircraft part, a wind turbine part, eyeglasses, a mirror, a power transmission line, a container, a windshield, an engine part (e.g., piston or cylinder), or a portion or coating thereof.

In another aspect, the invention includes a method of utilizing a liquid-impregnated surface, the method comprising the steps of: providing an article comprising a liquid-impregnated surface, said liquid-impregnated surface comprising an impregnating liquid and a matrix of solid features spaced sufficiently close to stably contain the impregnating liquid therebetween or therewithin, said impregnating liquid and said matrix chosen such that S>0, whereby the impregnating liquid cloaks clusters upon their nucleation on the surface and restricts access of said clusters to their source medium surrounding the surface (e.g., where the cloaked clusters are condensed water droplets or bacterial colonies); and using the article at equilibrium or pseudo equilibrium, thereby preventing or inhibiting one or more of: ice/frost formation on the surface, bacterial growth on the surface, formation of liquid condensate on the surface, and fouling of the surface.

In certain embodiments, the impregnating liquid has viscosity greater than 50 cP. In certain embodiments, the impregnating liquid has viscosity greater than 100 cP. In certain embodiments, the impregnating liquid has viscosity greater than 300 cP (e.g., viscosity is about 500 cP or more).

In another aspect, the invention includes an article comprising a liquid-impregnated surface, said liquid-impregnated surface comprising an impregnating liquid and a matrix of solid features spaced sufficiently close to stably contain the impregnating liquid therebetween or therewithin, said impregnating liquid and said matrix chosen such that S>0, whereby the impregnating liquid cloaks clusters upon their nucleation on the surface and restricts access of said clusters to their source medium surrounding the surface (e.g., where the cloaked clusters are condensed water droplets or bacterial colonies), thereby preventing or inhibiting one or more of: ice/frost formation on the surface, bacterial growth on the surface, formation of liquid condensate on the surface, and fouling of the surface.

In certain embodiments, the impregnating liquid has viscosity greater than 50 cP, 100 cP, or 300 cP (e.g., about 500 cP or more).

In another aspect, the invention includes an article comprising a liquid-impregnated surface, said liquid-impregnated surface comprising an impregnating liquid and a matrix of solid features spaced sufficiently close to stably contain the impregnating liquid therebetween or therewithin, said impregnating liquid having viscosity greater than about 50 cP, 100 cP, or 300 cP (e.g., about 500 cP or more), thereby inhibiting formation of frost on the surface.

In another aspect, the invention includes a method of inhibiting frost formation on a surface, the method comprising: providing a liquid-impregnated surface, said liquid-impregnated surface comprising an impregnating liquid and a matrix of solid features spaced sufficiently close to stably contain the impregnating liquid therebetween or therewithin, said impregnating liquid having viscosity greater than about 50 cP, 100 cP, or 300 cP (e.g., about 500 cP or more); and using the article at equilibrium or pseudo equilibrium.

In another aspect, the invention includes an article comprising an interior surface, said article being at least partially enclosed (e.g., the article is an oil pipeline, other pipeline, consumer product container, other container) and adapted for containing or transferring a fluid of viscosity $\mu_1$, wherein the interior surface comprises a liquid-impregnated surface, said liquid-impregnated surface comprising an impregnating liquid and a matrix of solid features spaced sufficiently close to stably contain the impregnating liquid therebetween or therewithin, wherein the impregnating liquid comprises water (having viscosity $\mu_2$) (e.g., wherein the impregnating liquid is at least 50%, 60%, 70%, 80%, or 90% water) (e.g., "droplet phase" has higher viscosity than impregnating liquid (lubricant)—droplet slides instead of rolls, resulting in drag reduction).

In certain embodiments, $\mu1/\mu2$ is greater than 1. In certain embodiments, $\mu1/\mu2$ is greater than 0.1.

In certain embodiments, $(h/R)(\mu_1/\mu_2)$ is greater than 0.1, where h is the average height of the solid features and R is the radius of the pipe or the average fluid depth in an open system. In certain embodiments, $(h/R)(\mu_1/\mu_2)$ is greater than 0.5. In certain embodiments, R is less than 1 mm.

In certain embodiments, the impregnating liquid comprises an additive to prevent or reduce evaporation of the impregnating liquid. In certain embodiments, the additive is a surfactant.

In another aspect, the invention includes a method comprising providing the article described herein and using the article to transfer or contain the fluid of viscosity $\mu_1$.

BRIEF DESCRIPTION OF THE DRAWINGS

The objects and features of the invention can be better understood with reference to the drawing described below, and the claims.

DESCRIPTION

It is contemplated that compositions, mixtures, systems, devices, methods, and processes of the claimed invention encompass variations and adaptations developed using information from the embodiments described herein. Adaptation and/or modification of the compositions, mixtures, systems, devices, methods, and processes described herein may be performed by those of ordinary skill in the relevant art.

Throughout the description, where articles, devices, apparatus and systems are described as having, including, or comprising specific components, or where processes and methods are described as having, including, or comprising specific steps, it is contemplated that, additionally, there are articles, devices, apparatus and systems of the present invention that consist essentially of, or consist of, the recited components, and that there are processes and methods according to the present invention that consist essentially of, or consist of, the recited processing steps.

Similarly, where articles, devices, mixtures, apparatus and compositions are described as having, including, or comprising specific compounds and/or materials, it is contemplated that, additionally, there are articles, devices, mixtures, apparatus and compositions of the present invention that consist essentially of, or consist of, the recited compounds and/or materials.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

In some embodiment, a non-wetting, liquid-impregnated surface is provided that includes a solid having textures (e.g., posts) that are impregnated with an impregnating liquid. In general, solid features can be made from or comprise any material suitable for use in accordance with the present invention. In accordance with various embodiments of the present invention, micro-scale solid features are used (e.g., from 1 micron to about 100 microns in characteristic dimension). In certain embodiments, nano-scale solid features are used (e.g., less than 1 micron, e.g., 1 nm to 1 micron).

In some embodiments, the liquid-impregnated surface is configured such that water droplets contacting the surface are not pinned or impaled on the surface.

As used herein, emerged area fraction φ is defined as a representative fraction of the projected surface area of the liquid-impregnated surface corresponding to non-submerged solid at equilibrium. The term "equilibrium" as used herein refers to the condition in which the average thickness of the impregnating film does not change over time due to drainage by gravity when the substrate is held away from horizontal, and where evaporation is negligible (e.g., if the liquid impregnated liquid were to be placed in an environment saturated with the vapor of that impregnated liquid). Similarly, the term "pseudo-equilibrium" as used herein refers to the same condition except that evaporation may occur.

In general, a "representative fraction" of a surface refers to a portion of the surface with a sufficient number of solid features thereupon such that the portion is reasonably representative of the whole surface. In certain embodiments, a "representative fraction" is at least a tenth of the whole surface.

Figure 1:
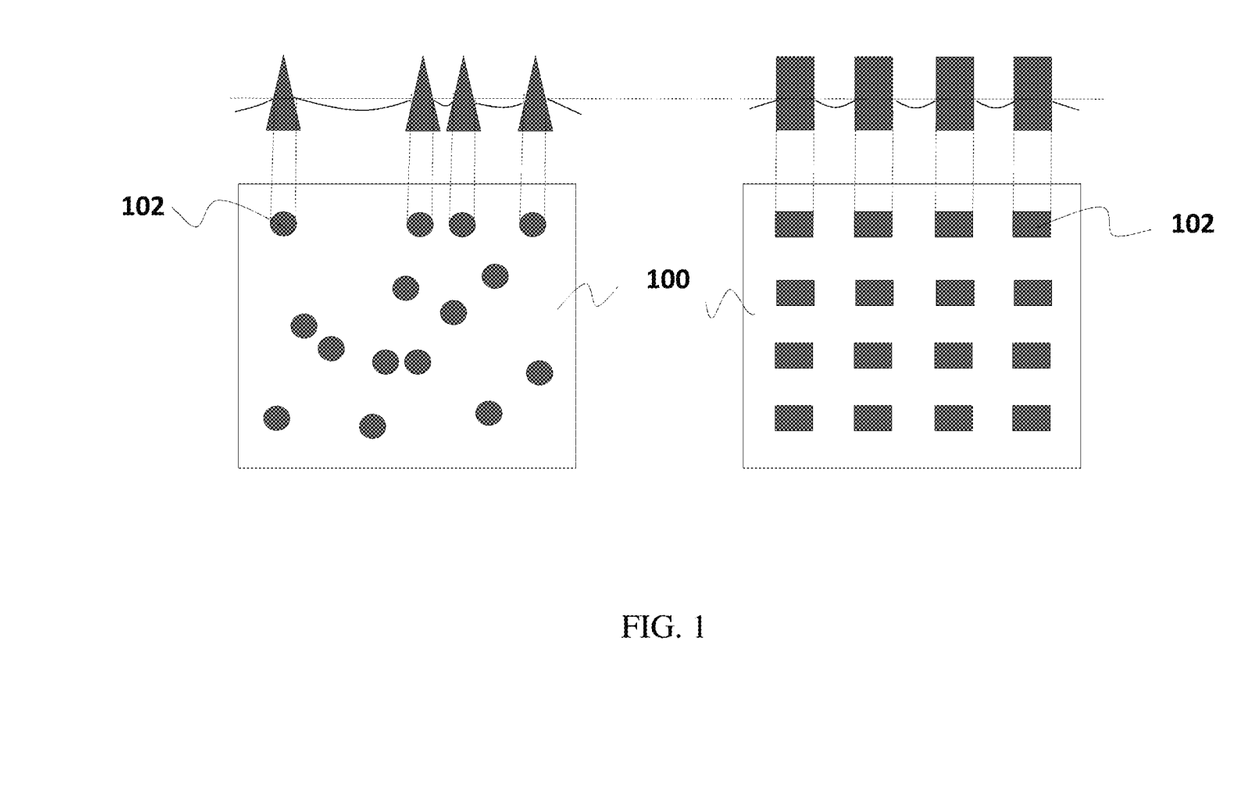
FIG. 1 illustrates a schematic cross-sectional and corresponding top view of a liquid-impregnated surface that are partially submerged.

Referring to FIG. 1, a schematic cross-sectional view and the corresponding top view of a liquid-impregnated surface that is partially submerged is shown. The upper left drawing of FIG. 1 shows a cross-sectional view of a row of cone-shaped solid features. The projected surface area of the non-submerged solid 102 is illustrated as shaded areas of the overhead view, while the remaining non-shaded area represents the projected surface area of the submerged liquid-impregnated surface 100. In addition to the projection surface area of this row of solid features, other solid features placed in a semi-random pattern are shown in shade in the overhead view. Similarly, the cross-section view of a row of evenly spaced posts is shown on the right of FIG. 1. Additional rows of well-patterned posts are shown in shade in the overhead view. As demonstrated, in some embodiments of the present invention, a liquid-impregnated surface includes randomly and/or non-randomly patterned solid features.

In certain embodiments of the present invention, $\phi$ is less than 0.30, 0.25, 0.20, 0.15, 0.10, 0.05, 0.01, or 0.005. In certain embodiments, $\phi$ is greater than 0.001, 0.005, 0.01, 0.05, 0.10, 0.15, or 0.20. In certain embodiments, $\phi$ is in a range of about 0 and about 0.25. In certain embodiments, $\phi$ is in a range of about 0 and about 0.01. In certain embodiments, $\phi$ is in a range of about 0.001 and about 0.25. In certain embodiments, $\phi$ is in a range of about 0.001 and about 0.10.

In some embodiments, the liquid-impregnated surface is configured such that cloaking by the impregnating liquid can be either eliminated or induced, according to different embodiments described herein.

As used herein, the spreading coefficient, $S_{ow(a)}$ is defined as $\gamma_{wa}-\gamma_{wo}-\gamma_{oa}$, where $\gamma$ is the interfacial tension between the two phases designated by subscripts w, a, and o, where w is water, a is air, and o is the impregnating liquid. Interfacial tension can be measured using a pendant drop method as described in Stauffer, C. E., "The measurement of surface tension by the pendant drop technique," J. Phys. Chem. 1965, 69, 1933-1938, the text of which is incorporated by reference herein. Exemplary surfaces and its interfacial tension measurements (at approximately 25° C.) are shown in Appendix D, in particular, Table S2.

Without wishing to be bound to any particular theory, impregnating liquids that have $S_{ow(a)}$ less than 0 will not cloak, resulting in no loss of impregnating liquids, whereas impregnating liquids that have $S_{ow(a)}$ greater than 0 will cloak matter (condensed water droplets, bacterial colonies, solid surface) and this may be exploited to prevent corrosion, fouling, etc. In certain embodiments, cloaking is used for preventing vapor-liquid transformation (e.g. water vapor, metallic vapor, etc.). In certain embodiments, cloaking is used for inhibiting liquid-solid formation (e.g., ice, metal, etc.). In certain embodiments, cloaking is used to make reservoirs for carrying the materials, such that independent cloaked materials can be controlled and directed by external means (like electric or magnetic fields).

In certain embodiments, lubricant cloaking is desirable and is used a means for preventing environmental contamination, like a time capsule preserving the contents of the cloaked material. Cloaking can result in encasing of the material thereby cutting its access from the environment. This can be used for transporting materials (such as bioassays) across a length in a way that the material is not contaminated by the environment.

In certain embodiments, the amount of cloaking can be controlled by various lubricant properties such as viscosity, surface tension. Additionally or alternatively, we can control the de-wetting of the cloaked material to release the material. Thus, it is contemplated that a system in which a liquid is dispensed in the lubricating medium at one end, and upon reaching the other end is exposed to environment that causes the lubricant to uncloak.

In certain embodiments, an impregnating liquid is or comprises an ionic liquid. In some embodiments, an impregnating liquid can be selected to have a $S_{ow(a)}$ less than 0. Exemplary impregnating liquids include, but are not limited to, tetrachloroethylene (perchloroethylene), phenyl isothiocyanate (phenyl mustard oil), bromobenzene, iodobenzene, o-bromotoluene, alpha-chloronaphthalene, alpha-bromonaphthalene, acetylene tetrabromide, 1-butyl-3-methylimidazolium bis(trifluoromethylsulfonyl) imide (BMIm), tribromohydrin (1,2,3-tribromopropane), ethylene dibromide, carbon disulfide, bromoform, methylene iodide (diiodomethane), stanolax, Squibb's liquid petrolatum, p-bromotoluene, monobromobenzene, perchloroethylene, carbon disulfide, phenyl mustard oil, monoiodobenzene, alpha-monochloro-naphthalene, acetylene tetrabromide, aniline, butyl alcohol, isoamyl alcohol, n-heptyl alcohol, cresol, oleic acid, linoleic acid, amyl phthalate and any combination thereof.

In accordance with the present invention, exemplary solid features include, but are not limited to, polymeric solid, a ceramic solid, a fluorinated solid, an intermetallic solid, and a composite solid and any combination thereof. As demonstrated in FIG. 1, solid features can comprise any suitable shapes and/or define any suitable structures. Exemplary solid features include, but are not limited to, pores, cavities, wells, interconnected pores, and interconnected cavities and any combination thereof.

In some embodiments, solid features have a roughened surface. As used herein, $\theta_{os(a)}$ is defined as the contact angle of oil (subscript 'o') on the textured solid (subscript 's') in the presence of air (subscript 'a'). In certain embodiments, the roughened surface of solid features provides stable impregnation of liquid therebetween or therewithin, when $\theta_{os(v)}>\theta_c$.

In certain embodiments, liquid-impregnated surfaces described herein have advantageous droplet roll-off properties that minimize the accumulation of the contacting liquid on the surfaces. Without being bound to any particular theory, a roll-off angle $\alpha$ of the liquid-impregnated surface in certain embodiments is less than 50°, less than 40°, less than 30°, less than 25°, or less than 20°.

Typically, flow through a pipe or channel, having a liquid-impregnated surface on its interior:

$$\frac{Q}{\Delta p/L} \sim \left(\frac{R^4}{\mu_1}\right)\left[1+\left(\frac{h}{R}\right)\left(\frac{\mu_1}{\mu_2}\right)\right] \quad (1)$$

where Q is the volumetric flow rate, R is pipe radius, h is the height of the texture, $\mu_2$ is the viscosity of lubricant and $\mu_1$ is the viscosity of the fluid flowing through the pipe. $\Delta p/L$ is the pressure drop per L. Without being bound to any particular theory, it is believed that $(h/R)(\mu_1/\mu_2)$ is greater than 1 for this to have a significant effect and this sets the height of the texture in relation to the viscosity ratio.

Although modeled for pipe flow, the general principals also apply to open systems, where R is replaced with the characteristic depth of the flowing material. The average velocity of the flow ~Q/A, where A is the cross-sectional area of the flowing fluid.

For example, mayonnaise has a viscosity that approaches infinity at low shear rates (it is a Bingham plastic (a type of non-Newtonian material)), and therefore behaves like a solid as long as shear stress within it remains below a critical value. Whereas, for honey, which is Newtonian, the flow is much slower. For both systems, h and R are of the same order of magnitude, and $\mu_2$ is the same. However, since $\mu_{honey} \ll \mu_{mayonnaise}$, then $$\left(\frac{h}{R}\right)\left(\frac{\mu_{honey}}{\mu_2}\right) \ll \left(\frac{h}{R}\right)\left(\frac{\mu_{mayonnaise}}{\mu_2}\right) \quad (2)$$

thus mayonnaise flows much more quickly out of the bottle than honey.

According to some embodiments of the present invention, an article includes an interior surface, which is at least partially enclosed (e.g., the article is an oil pipeline, other pipeline, consumer product container, other container) and adapted for containing or transferring a fluid of viscosity $\mu_1$, wherein the interior surface comprises a liquid-impregnated surface, said liquid-impregnated surface comprising an impregnating liquid and a matrix of solid features spaced sufficiently close to stably contain the impregnating liquid therebetween or therewithin, wherein the impregnating liquid comprises water (having viscosity $\mu_2$). In certain embodiments, $\mu 1/\mu 2$ is greater than about 1, about 0.5, or about 0.1.

In certain embodiments, the impregnating liquid comprises an additive to prevent or reduce evaporation of the impregnating liquid. The additive can be a surfactant. Exemplary surfactants include, but are not limited to, docosanoic acid, trans-13-docosenoic acid, cis-docosenoic acid, nonylphenoxy tri(ethyleneoxy) ethanol, methyl 12-hydroxyoetadecanate, 1-Tetracosanol, fluorochemical "L-1006", and combination thereof. More details can be found in White, Ian. "Effect of Surfactants on the Evaporation of Water Close to 100 C." *Industrial & Engineering Chemistry Fundamentals* 15.1 (1976): 53-59, the contents of which are incorporated herein by references. In addition or alternative, exemplary additives can be $C_{16}H_{33}COOH$, $C_{17}H_{33}COOH$, $C_{18}H_{33}COOH$, $C_{19}H_{33}COOH$, $C_{14}H_{29}OH$, $C_{16}H_{33}OH$, $C_{18}H_{37}OH$, $C_{20}H_{41}OH$, $C_{22}H_{45}OH$, $C_{17}H_{35}COOCH_3$, $C_{15}H_{31}COOC_2H_5$, $C_{16}H_{33}OC_2H_4OH$, $C_{18}H_{37}OC_2H_4OH$, $C_{20}R_{41}OC_2H_4OH$, $C_{22}H_{45}OC_2H_4OH$, Sodium docosyl sulfate, poly(vinyl stearate), Poly (octadecyl acrylate), Poly (octadecyl methacrylate) and combination thereof. More details can be found in Barnes, Geoff T. "The potential for monolayers to reduce the evaporation of water from large water storages." *Agricultural Water Management* 95.4 (2008): 339-353, the contents of which are incorporated herein by references.

EXPERIMENTAL EXAMPLES

Example 1

Figure 2:
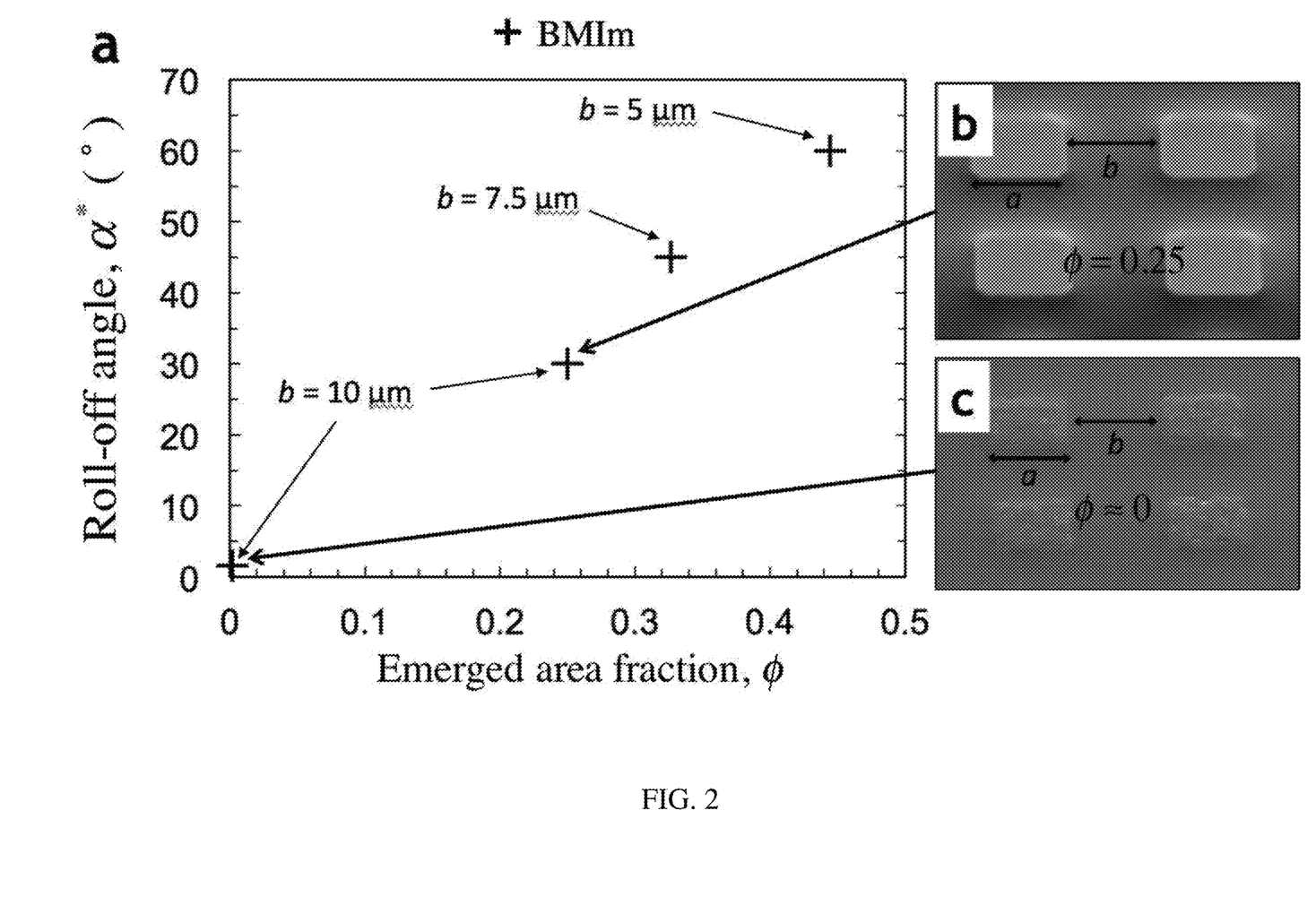
FIG. 2 includes a plot of roll-off angle versus emerged area fraction φ and two SEM images of BMIm impregnated texture, in accordance with certain embodiments of the invention.

FIG. 2 shows experimental measurements of water droplet mobility on liquid impregnating surfaces. FIG. 2a is a plot of roll-off angle α as a function of emerged area fraction ϕ, for different surfaces (feature spacing b varies). An ionic liquid (1-butyl-3-methylimidazolium bis(trifluoromethylsulfonyl) imide (BMIm) was used as a impregnating liquid in this work. The top inset (FIG. 2b) shows an SEM image of the BMIm impregnated texture and shows that the post tops are dry. In FIG. 2c, when the posts are further roughened by adding nanograss, they are covered with BMIm (bottom inset) and consequently, the roll-off angle decreases.

The experiments of FIG. 2 demonstrate that liquid-impregnated surfaces can be engineered to provide resistance to impalement and to provide non-wettability, without requiring replenishment of impregnating fluid to make up for liquid lost to cloaking (BMIm is an example liquid that does not cloak in the presence of air and water), and without requiring replenishment of impregnating liquid to maintain coverage over the tops of the solid features.

BMIm impregnated textures showed roll-off angles which increase as the spacing decreases. This observation shows that pinning is non-negligible in this case, and occurs on the emergent post tops (FIG. 2b). However, we were able to significantly reduce this pinning by adding a second smaller length scale texture (i.e., nanograss on the posts), so that BMIm impregnated the texture even on the post tops, thereby substantially reducing ϕ (though still non-zero) (see FIG. 2c). It is important to note that the reduction in the emergent area fraction ϕ is not due to the absolute size of the texture features; since the oil-water and oil-air interfaces typically intersect surface features at contact angles $\theta_{os(w)}$ and $\theta_{ow(a)}$, ϕ rather depends on these contact angles and feature geometry.

Example 2

This Example demonstrates that condensation can be inhibited by preventing coalescence due to liquid cloaking.

Figure 3:
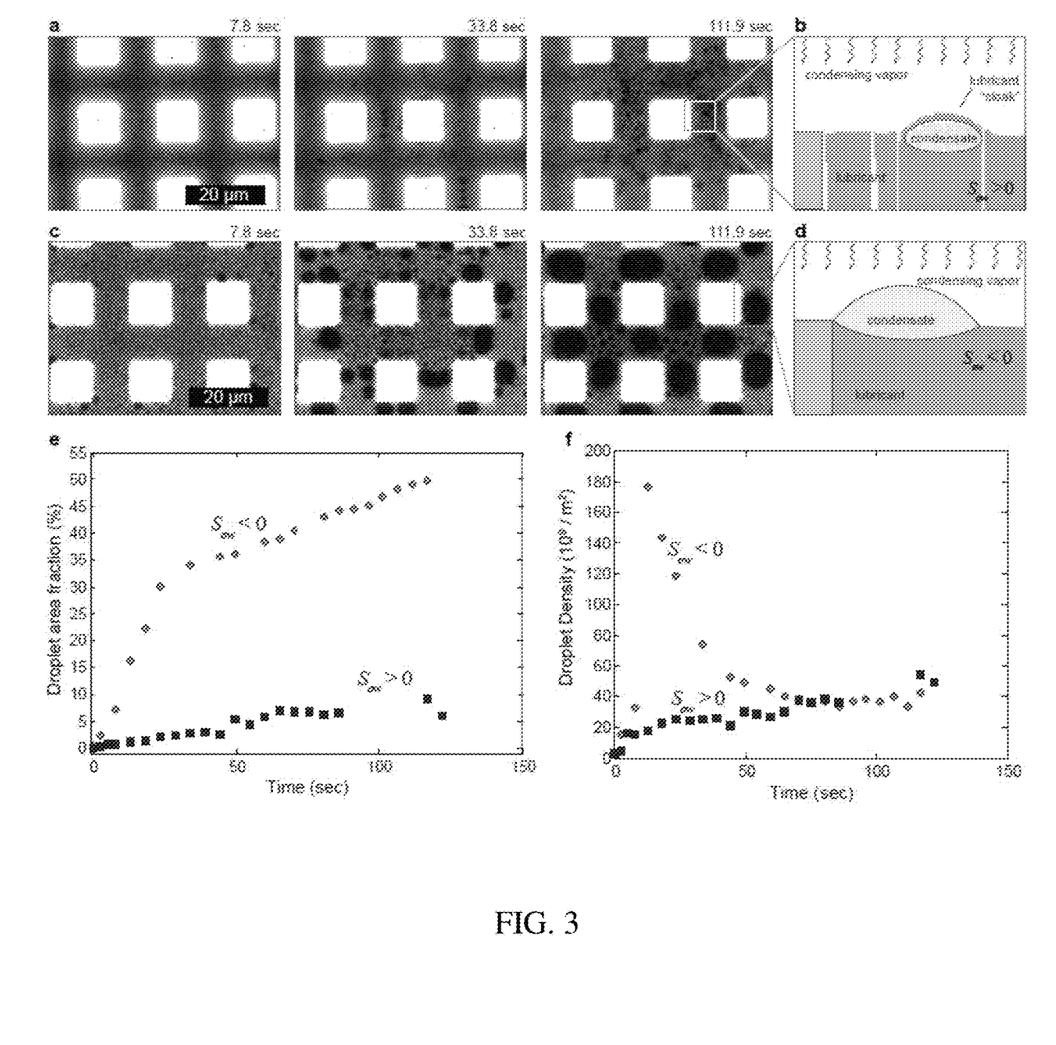
FIG. 3 and FIG. 4 demonstrate condensation inhibition by preventing coalescence due to liquid cloaking, in accordance with certain embodiments of the invention.

FIG. 3a shows an ESEM image sequence of condensation on a micropost surface impregnated with Krytox that has positive spreading coefficient on water (Sow>0). Condensation is inhibited as Krytox cloaks the condensed droplets. FIG. 3b illustrates cloaked condensate droplet depicting the thin film of condensate that spreads on the droplet. FIG. 3c shows an ESEM image sequence of condensation on micropost surface impregnated with BMIm that has negative spreading coefficient with water (Sow<0). FIG. 3b illustrates uncloaked condensate droplet depicting the three phase contact line of the water-vapor, water-lubricant, and lubricant-vapor interfaces on one end and pinning of the droplet at the dry post tops at the other end. FIG. 3e is a plot comparing variation of surface area fraction covered by condensed water droplets versus time on surfaces impregnated with Krytox (Sow>0, solid squares) and BMIm (Sow<0, open diamonds). FIG. 3f is a Plot comparing number of water droplets per unit area versus time on surfaces impregnated with Krytox (solid squares) and BMIm (open diamonds). The ESEM experiments were conducted under identical conditions (pressure=800 Pa, substrate temperature ~3.6° C., beam voltage=25 kV and beam current=1.7 nA). In the analysis, t=0 s is defined as the first frame in which water drops can be identified.

Figure 4:
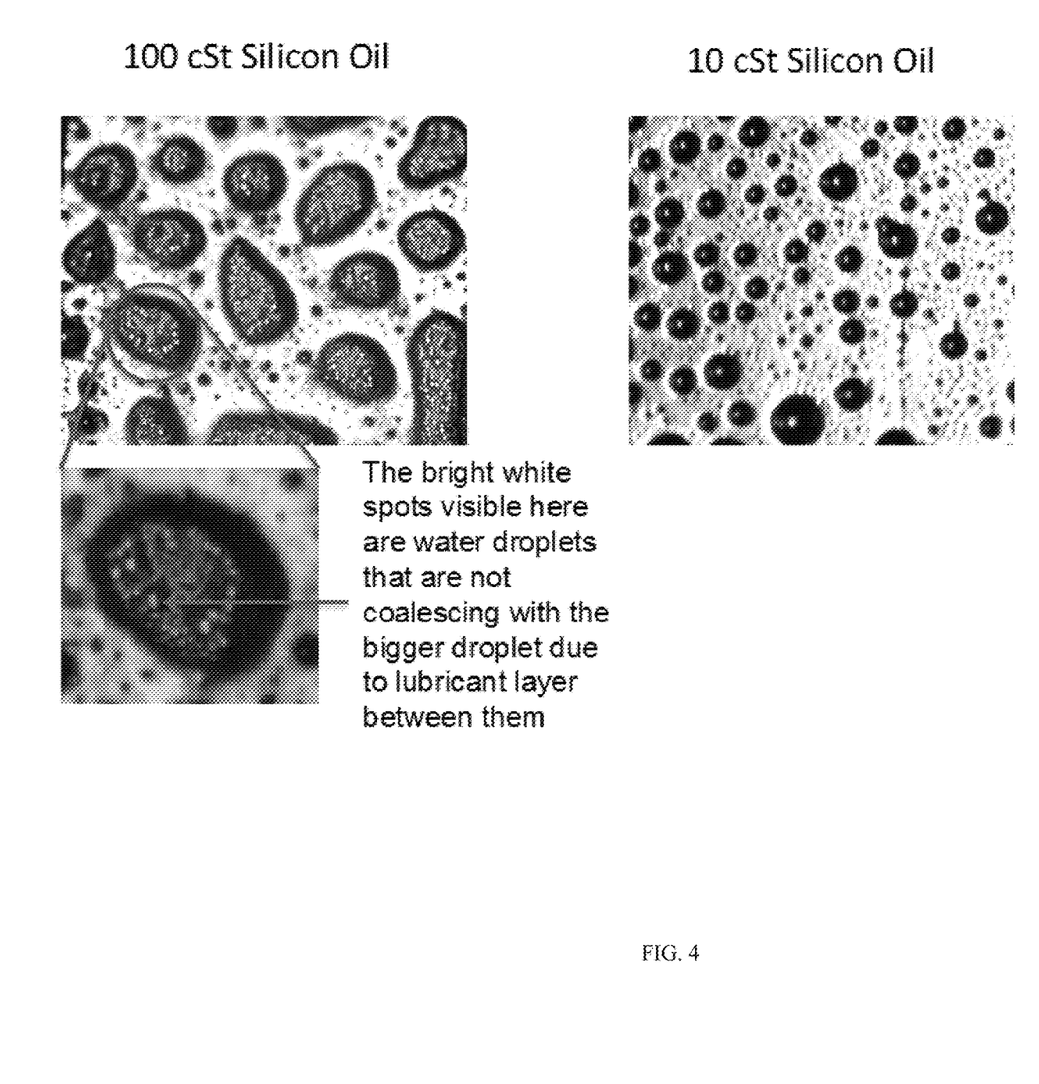

Referring to FIG. 4, the very high subcooling is sufficient for condensation rate to overcome the cloaking phenomenon for 10 cSt oil. The temperature of the peltier cooler was set at −5° C. The room temperature was 20° C., and the dew point in the conditions was 12° C. However, the barrier for coalescence is significantly higher on more viscous lubricant even at this high degree of subcooling. As a result, the droplets appear on 10 cSt oil as hemispherical shapes, whereas on more viscous lubricant their sphericity is significantly low.

Example 3

This Example demonstrates that condensation can be inhibited by limiting nucleation on high viscosity liquids.

Figure 5:
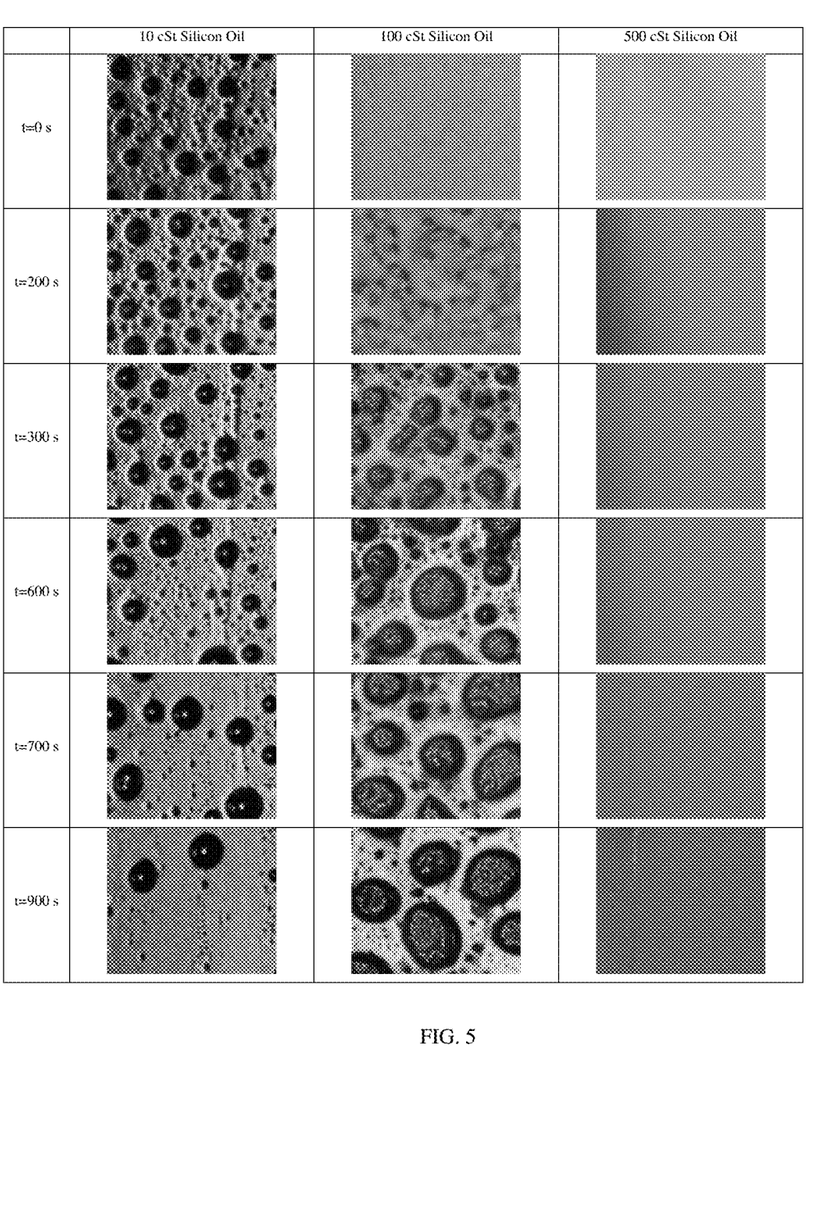
FIG. 5 demonstrates condensation inhibition by less nucleation on high viscosity liquids, in accordance with certain embodiments of the invention.

Similar to the conditions described in Example 2, the temperature of the peltier cooler was set at −5° C. The room temperature was 20° C., and the dew point in the conditions was 12° C. As can be seen in FIG. 5, the condensation rate is significantly decreased as viscosity of the oil increases. This is because the more viscous an oil, the less rapid the deformation of its surface upon adsorption of vapor molecules. Whereas on low viscosity liquids, the more rapid change of curvature upon deformation leads a more rapid decrease in the energy barrier for condensation to proceed, and hence more rapid condensation.

Example 4

This Example demonstrates that frost can be inhibited by limiting nucleation on high viscosity liquids.

Figure 6:
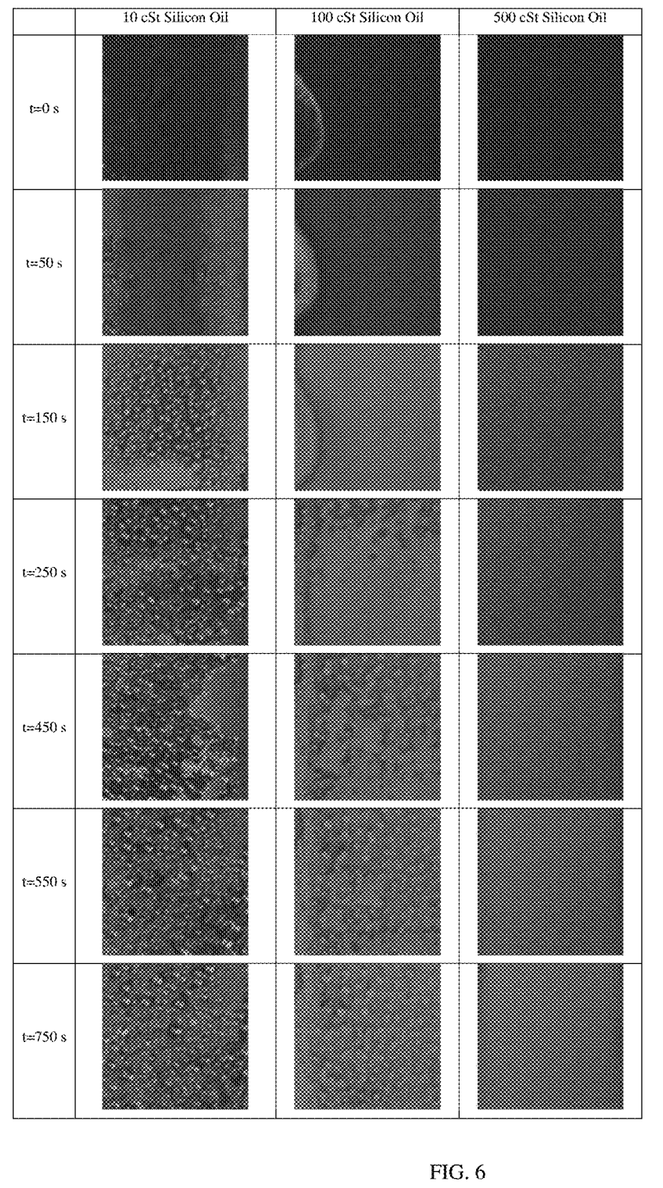
FIG. 6 demonstrates frost inhibition by less nucleation on high viscosity liquids, in accordance with certain embodiments of the invention.

Similar to the conditions described above, the temperature of the peltier cooler was set at −15° C. The experiments were conducted in low relative humidity environment such the dew point in the conditions was −10° C. In these conditions, water vapor forms directly as frost on the peltier plate. However, on the impregnated surface, water vapor still forms as droplets, and frost. As can be seen in FIG. 6, the frost formation rate is significantly decreased as viscosity of the oil increases. On low viscosity liquid, the water phase show mobility signifying that water exists as supercooled droplets.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An article comprising a liquid-impregnated surface, said surface comprising an impregnating liquid and a matrix of solid features spaced sufficiently close to stably contain the impregnating liquid therebetween or therewithin, wherein one or both of the following holds:
   (i) $0<\phi\leq0.25$, where $\phi$ is a representative fraction of the projected surface area of the liquid-impregnated surface corresponding to non-submerged solid at equilibrium; and
   (ii) $S_{ow(a)}<0$, where $S_{ow(a)}$ is spreading coefficient, defined as $\gamma_{wa}-\gamma_{wo}-\gamma_{oa}$, where $\gamma$ is the interfacial tension between the two phases designated by subscripts w, a, and o, where w is water, a is air, and o is the impregnating liquid,
   wherein the liquid-impregnated surface is non-wetting to a contacting liquid.

2. The article of claim 1, wherein $0.001<\phi\leq0.25$.

3. The article of claim 1, wherein $0.001<\phi\leq0.10$.

4. The article of claim 1, wherein $S_{ow(a)}<0$.

5. The article of claim 1, wherein the impregnating liquid comprises an ionic liquid.

6. The article of claim 1, wherein the impregnating liquid comprises at least one member selected from the group consisting of tetrachloroethylene (perchloroethylene), phenyl isothiocyanate (phenyl mustard oil), bromobenzene, iodobenzene, o-bromotoluene, alpha-chloronaphthalene, alpha-bromonaphthalene, acetylene tetrabromide, 1-butyl-3-methylimidazolium bis(trifluoromethylsulfonyl) imide (BMIm), tribromohydrin (1,2,3-tribromopropane), ethylene dibromide, carbon disulfide, bromoform, methylene iodide (diiodomethane), stanolax, Squibb's liquid petrolatum, p-bromotoluene, monobromobenzene, perchloroethylene, carbon disulfide, phenyl mustard oil, monoiodobenzene, alpha-monochloro-naphthalene, acetylene tetrabromide, aniline, butyl alcohol, isoamyl alcohol, n-heptyl alcohol, cresol, oleic acid, linoleic acid, and amyl phthalate.

7. The article of claim 1, wherein the solid features comprise at least one member selected from the group consisting of a polymeric solid, a ceramic solid, a fluorinated solid, an intermetallic solid, and a composite solid.

8. The article of claim 1, wherein the solid features comprise a chemically modified surface, a coated surface, and/or a surface with a bonded monolayer.

9. The article of claim 1, wherein the solid features define at least one member selected from the group consisting of pores, cavities, wells, interconnected pores, and interconnected cavities.

10. The article of claim 1, wherein the solid features comprise at least one member selected from the group consisting of posts, nanoneedles, nanograss, substantially spherical particles, and amorphous particles.

11. The article of claim 1, wherein the solid features have a roughened surface.

12. The article of claim 1, wherein $0<\phi\leq0.25$.

13. The article of claim 12, wherein $0<\phi\leq0.10$.

14. The article of claim 1, wherein the liquid-impregnated surface is configured such that water droplets contacting the surface are not pinned or impaled on the surface and have a roll-off angle $\alpha$ of less than 40°.

15. The article of claim 14, wherein the water droplets have a roll-off angle $\alpha$ of less than 25°.

* * * * *